Aug. 6, 1963          G. T. PIPER          3,099,869

PROCESS OF BONDING METALS

Original Filed Dec. 2, 1953          3 Sheets-Sheet 1

United States Patent Office 3,099,869
Patented Aug. 6, 1963

3,099,869
PROCESS OF BONDING METALS
Glenn T. Piper, North Canton, Ohio, assignor to The Hoover Company, North Canton, Ohio, a corporation of Ohio
Original application Dec. 2, 1953, Ser. No. 395,782. Divided and this application Dec. 19, 1958, Ser. No. 781,531
1 Claim. (Cl. 22—204)

This application is a division of my co-pending application, Serial Number 395,782, filed December 2, 1953, entitled Process of Bonding Metals and Article Produced Thereby.

My invention is directed to the production of bimetallic articles of dissimilar metals joined by a mechanical bond characterized by high mechanical strength and high resistance to thermal shock, and the process of producing bonds having the foregoing characteristics between dissimilar metals.

It is a more particular object of my invention to provide a bimetallic article of a main body portion of an aluminum containing metal which is bonded to a thin section plate of ferrous metal such as stainless steel by an intermediate sprayed layer of a ductile corrosion resistant metal such as aluminum, molybdenum or stainless steel.

It is another object of my invention to provide a process of forming a bimetallic article which consists in suitably forming a sheath plate of stainless steel or other ferrous metal, grit blasting the surface of the sheath to be bonded to the composite body, applying a thin coat of sprayed metal such as aluminum, molybdenum or stainless steel onto the grit blasted surface of the sheath, and then die casting an aluminum containing matrix or body onto the sprayed metal surface of the sheath plate to form a bond having high mechanical strength and high thermal shock resistance between the sheath and main body or matrix of aluminum containing metal.

It is a more specific object of my invention to provide a cast type smoothing iron sole plate having an aluminum metal main body portion firmly bonded to a thin section stainless steel sheath plate forming an ironing surface in which the bond is characterized by the absence of a ferro-aluminum alloy layer at the interface between the ferrous and aluminum containing metals.

It is a particular object of the invention to provide a composite article consisting of a stainless steel sheath plate having a sprayed ductile metal coating applied to one surface thereof onto which an aluminum metal matrix is die cast under conditions such that a firm, strong and thermal shock resistant bond is formed between the various metal layers.

Modern smoothing irons are usually electrically heated and are largely fabricated of aluminum metal bodies which are cast around and embed a rod-type electrical heating element. Such sole plates are characterized by high thermal conductivity, high corrosion resistance, light weight, and present a pleasing appearance. Additionally, sole plates of the above described character are equally well suited for incorporation in dry or steam irons. Iron sole plates of the foregoing type do suffer from the disadvantage that the aluminum metal ironing surface is not highly resistant to abrasion even when the aluminum containing alloy of which the sole plate is made is of the so-called hard aluminum alloys and the aluminum metal ironing surfaces are subject to scratching and discoloration in the use of the iron so as to present an unpleasing appearance. Iron sole plates constructed according to my invention have a polished stainless steel sheath forming the actual ironing surface bonded throughout its area to the cast aluminum body by a bond of ductile metal, such as aluminum, molybdenum or stainless steel which are also highly corrosion resistant. The bond between the stainless steel sheath and the aluminum body has high thermal shock resistance. Steam ducts passing through the joined faces of the various metal layers always pass through metal characterized by high corrosion resistance whereby there is no opportunity for corrosion to occur along the length of the duct or to creep along an interfacial layer tending to separate the dissimilar metals forming the composite sole plate. Additionally, the aluminum metal body is of substantial thickness and is bonded throughout the area of one face thereof to a thin section stainless steel sheath whereby the ironing face of the stainless steel sheath is uniformly heated by the highly conductive aluminum metal body and the thin stainless steel sheath does not appreciably reduce the heat conductivity from the heating element to the operating surface of the sole plate.

Other objects and advantages of my invention will become apparent as the description proceeds when taken in connection with the accompanying drawings wherein.

Figure 8:
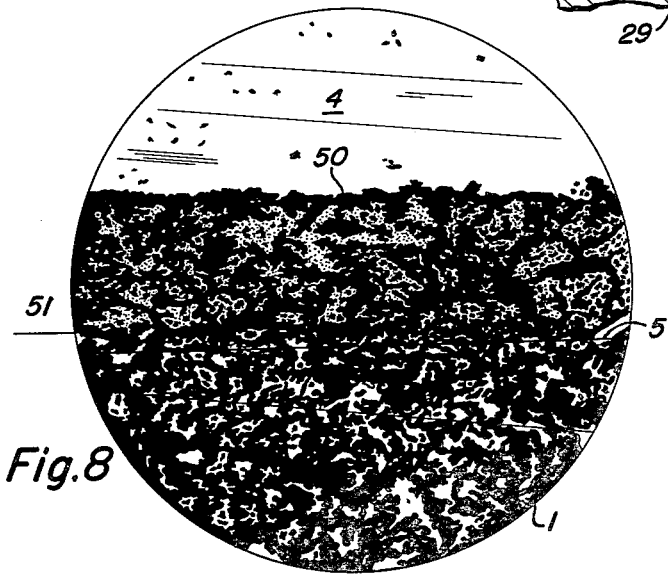
Figure 7:
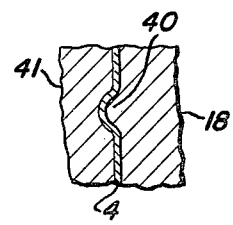

FIGURE 7 is a fragmentary sectional view taken on an enlarged scale through a section of the die showing the manner in which the pressure of the die cast metal is used to deform the stainless steel sheath to provide steam distribution ducts in the ironing surface of the sole plate sheath plate during the die casting operation; and FIGURE 8 is a view representing a photomicrograph magnified approximately 400 times showing the structure of the various layers of metal in the completed sole plate.

Referring now to the drawings in detail, and first to FIGURES 1 and 2 thereof, a smoothing iron sole plate structure adapted for use in a steam iron will be described. It will be understood that the process to be described hereinafter is equally applicable to the production of other bimetallic articles. The steam iron sole plate of FIGURES 1 and 2 comprises a principal die cast body 1 of aluminum or aluminum containing metal, preferably a relatively hard aluminum-copper alloy. The die cast body 1 embeds a rod-type electrical heating element 2 about which the body 1 is cast in a manner to be described herienafter. The ends 3 of the heating element 2 project upwardly above the surface of the die cast body 1 to form projecting portions to which an electrical connection can be made in a known manner. The body 1 has the lower surface thereof bonded to a thin section stainless steel sheet 4, for example type 430 steel 0.012 inch thick, which is firmly joined to the die cast body 1 by an intermediate layer 5 of ductile metal such as aluminum, molybdenum or stainless steel initially applied to the sheet 4 by spraying and against which the body 1 is die cast in a manner to be described hereinafter.

The composite sole plate structure above described is equally applicable to steam or dry irons. However, I have illustrated the same as applied to a steam iron structure of a generally known type which includes a steam generating chamber 6 and steam and diffusion passageways 7 cast into the metal of the body 1.

Figure 1:
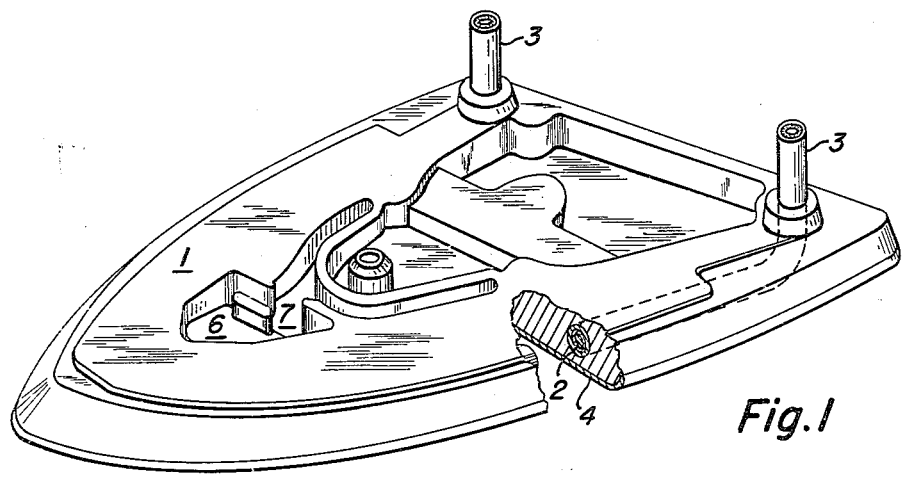
FIGURE 1 is a perspective view partly in section illustrating a complete iron sole plate embodying my invention and produced by the process of my invention.
Figure 2:
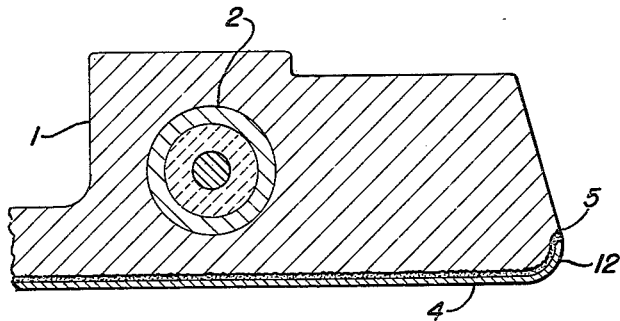
FIGURE 2 is an enlarged scale transverse sectional view of the section of the sole plate of FIGURE 1 illustrating an edge portion of the sole plate with the embedded heating element and showing the various metallic layers constituting the completed article.

I will now describe my process using as an example the manufacture of a sole plate structure such as that illustrated in FIGURE 1.

Figure 3:
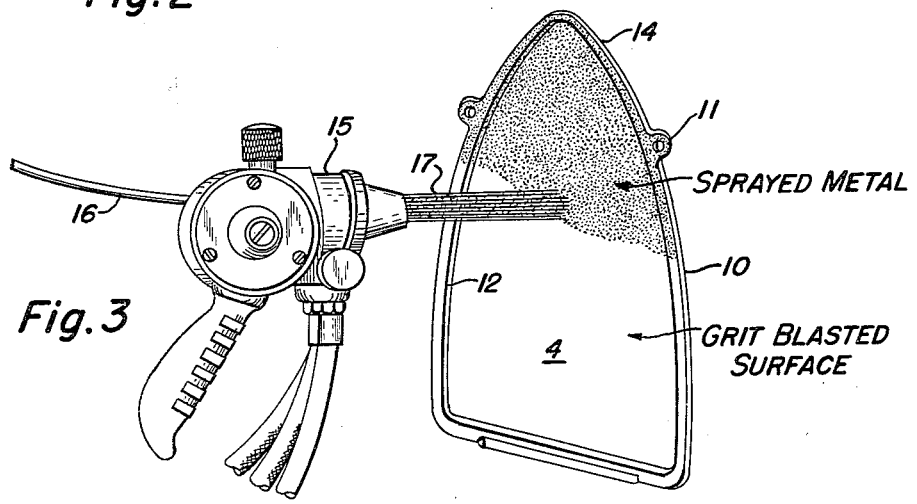
FIGURE 3 is a schematic view illustrating the step of applying a sprayed metal coating to a previously sand-blasted sole plate sheath.

Referring now to FIGURE 3, the plate 4 is illustrated in its initial condition and during the application of the sprayed metal coating thereto and prior to final trimming. As illustrated in FIGURE 3, the plate 4 includes a peripheral flange 10 and two perforated ears 11 projecting laterally therfrom. The flange 10 is joined to the flat body portion of the plate 4 by an upstanding rim flange 12 which forms the upturned edge section of the ironing surface as indicated in FIGURE 2. In the condition shown in FIGURE 3, the plate 4 has been formed by any suitable and well known means such as die cutting and drawing or stamping. The surface of the plate 4 which is visible in the drawing has been subjected to an appreciable sand or grit blasting operation, preferably using 60 to 80 mesh grit, to insure that the entire surface thereof is roughened and scratched and then degreased in any suitable manner.

As illustrated in FIGURE 3, the sole plate sheath 4 is standing upright and would preferably be held in a suitable type of frame, not shown, while it is being subjected to a metal spray to form a spray coating 14 thereon as indicated in the upper portion of the figure. The metal 14 is applied to the plate to a depth of 0.005 to 0.008 inch thick through a conventional type of spray gun 15 in which the metal to be sprayed is applied in the form of a wire or rod 16 where it feeds into the gun 15 and is melted in a high-temperature flame and is then blasted in a stream 17 onto the surface to be sprayed. The expression "thin film" of metal as used herein means a film of the order specified hereinabove.

In practice of my process, several metals have been found to be satisfactory; namely, aluminum or aluminum alloys, molybdenum and stainless steel. All of these metals have high corrosion resistance, are readily applied by metallizing guns, are ductile and form a firm bond with the sand-blasted surface of the stainless steel sheath 4. In addition, all of these metals have been found to provide excellent surfaces upon which the main aluminum metal body of the article may be die cast, as will be apparent hereinafter.

Figure 4:
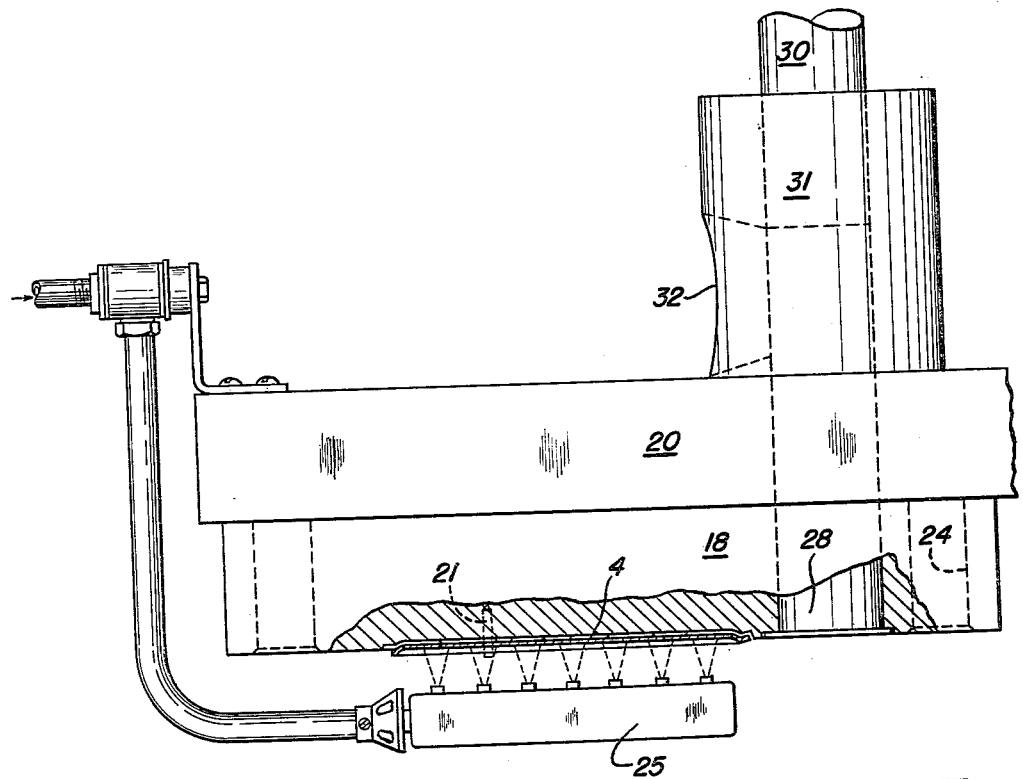
FIGURE 4 is a composite view illustrating the die of a die-casting machine and a heating element for heating a sprayed metal coating on a sole plate sheath while the same is positioned in the die just prior to the die casting operation.
Figure 4:
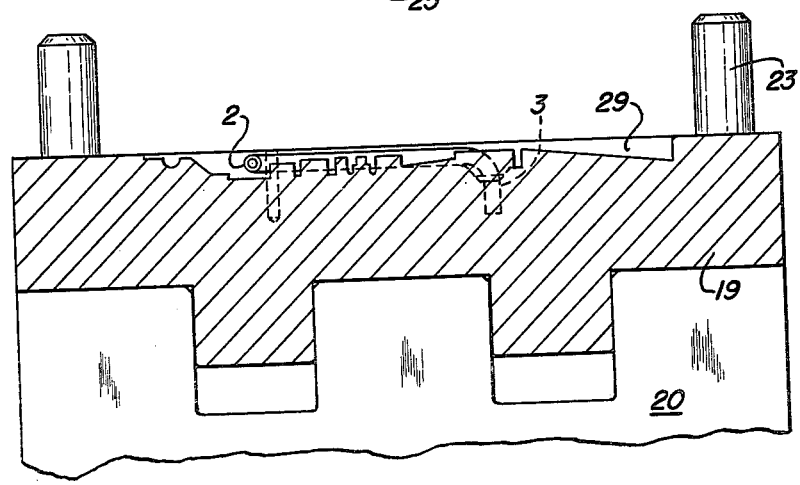

After completion of the spraying operation illustrated in FIGURE 3, the sprayed metal plate 4 is placed in the casting die as indicated in FIGURE 4. The die structure comprises a pair of mating dies 18 and 19, mounted in a known manner in the parts of a die casting machine indicated in part by the reference character 20. It is preferred to maintain the dies at a temperature of about 500° F. to 600° F. to prevent too rapid chilling of the cast metal. The sheath 4 is mounted in a shallow cavity in the die member 18 and is supported in position in the cavity by engaging the perforated ears 11 on small positioning pins 21 mounted in the die member 18. These pins serve to position the plate 4 in proper relation to the parts of the die.

The die member 19 is provided with projecting die pins 23 which are adapted to enter suitable holes 24 formed in the die member 18 to insure proper alignment of the two parts of the die and proper mating of the cavities formed therein.

The die member 19 is formed to engage the connecting portion 3 of the heating element 2 in suitable bores formed therefor and to hold the heating element 2 in proper position within the cavity of the die so as to have the aluminum containing metal cast completely therearound except for the shielded mounting and connecting portions 3.

Figure 5:
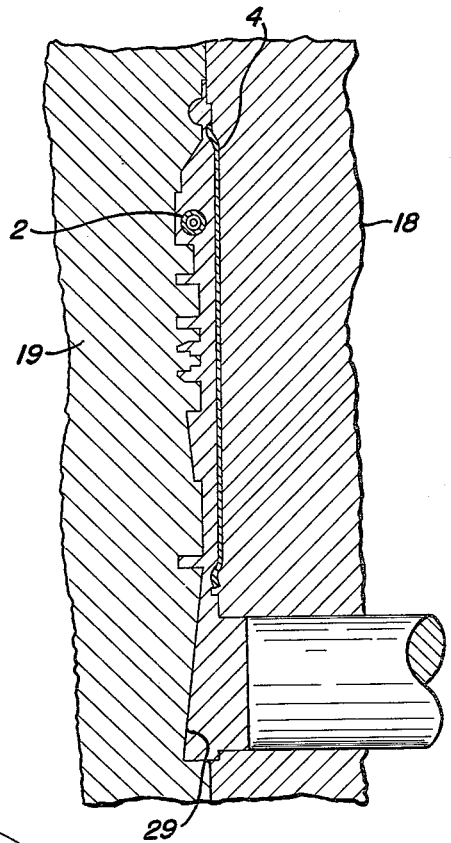
FIGURE 5 is a fragmentary sectional view through the die of FIGURE 4 showing the position of the parts after the die has closed and the die cast metal has been forced into the die cavity.

After the plate 4 is mounted upon the pins 21 and positioned in die member 18, a swinging gas burner 25 is brought into the position shown in FIGURE 4 where it is between the separated die members 18 and 19. The gas heater 25 serves to heat the sprayed metal surface of the sheath plate 4 to approximately 800° F. This is not a critical figure but it is a preferred value and may be departed from by approximately 200° F. either way. The purpose of this intermediate heating operation is to insure that the die cast metal will flow into the interstices in the sprayed metal surface without chilling so quickly that the die cast metal will bridge the roughened surfaces and will not form a good bond with the sprayed metal. The heating operation requires only a few seconds as it is intended only ot preheat the sprayed metal surface. After the heating operation is completed, the burner 25 is swung out of position between the parts of the die and the die casting machine is operated to close the two halves of the die 18 and 19 to their casting position as illustrated in FIGURE 5. Other types of heating means may be used to heat the sprayed film if desired.

The die casting machine is formed with a projecting metal feed member 31 having a pouring opening 32 in the top thereof which terminates in a feed channel 28 extending through the feed member 31 the adjacent portion of the casting machine and the die 18 to a depression 29 formed in die 19 and communicating with the cavities in the dies.

A plunger 30 rides in the metal feed channels 28. Molten metal is supplied through the feed passageway 32 in the member 31 into the path of the plunger 30 to be forced through the passageway 28 into the depression 29 and thence into the die cavities.

In practicing my invention, I have found it conducive to the production of firm and continuous bonds to supply the molten metal at a relatively high temperature, high rate of feed and high pressure. For example, in casting the sole plate of the iron illustrated in FIGURES 1 and 2, which is a known type except for the stainless steel ironing surface, it has been found desirable to supply molten aluminum metal to the die casting machine at temperatures of approximately 1350° F. The plunger forces the metal into the die under a pressure ranging from 7500 to 12,000 pounds per square inch, with 10,000 pounds per square inch a preferred die casting pressure. It is also desirable to use a high plunger speed and in the example herein given a plunger 2½ inches in diameter traveling at a speed of about 450 feet per minute is preferred though firm bonds have been made with plunger speeds on the order of 190 feet per minute. The expression "high speed casting" is used herein to refer to casting conditions such as those specified for 2½ inch plunger size and 450 feet per minute feed. Under the foregoing die casting conditions, the die casting metal forms an intimate bond with the sprayed metal surface throughout the extent thereof and completely fills the cavities in the die to form a sole plate structure of the desired shape. After the casting metal is "shot" into the die, it is allowed to stand for about 15 to 20 seconds, by which time the cast metal has solidified and the completed casting can be removed from the die in preparation for a subsequent operation.

Figure 6:
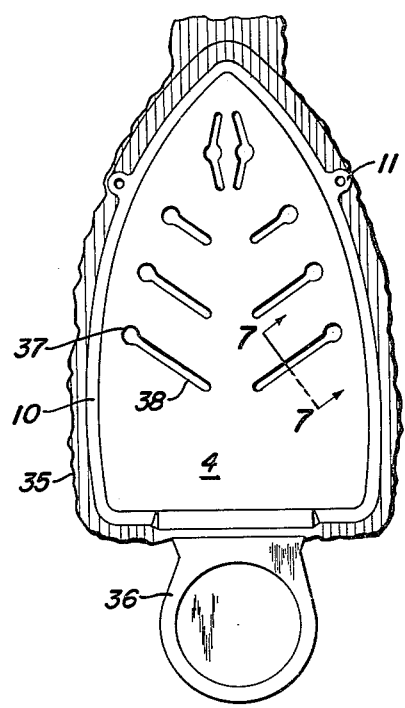
FIGURE 6 is a plan view of the completed composite sole plate structure as the same appears just after removal from the die of FIGURE 5.

FIGURE 6 illustrates the appearance of the composite casting as removed from the die. This view is taken looking at the exterior surface of the sheath plate 4 and shows flash metal 35 projecting beyond the sheath flange 10, which is customarily formed in die casting operations. The plug of metal forming a sprue 36 is still attached to the casting. After the casting is removed from the die, the sprue 36, flashing 35 and flange 10 of the plate 4 are die-cut or ground off to form the finished sole plate as illustrated in FIGURE 1.

The above described process has been described in connection with the formation of a sole plate for steam irons. As shown in FIGURE 6, the sole plate structure as it is removed from the die is formed with partially circular-shaped depressions 37 extending upwardly into the body of the iron and joining in similarly projecting grooves 38. In the final finishing operation, steam ducts will be bored through the depressions 37 so that in use of the iron, steam will discharge downwardly below the surface of the sheath 4 through the holes formed through the depressions 37 and can be distributed over the surface being ironed through the ducts or channels 38.

Referring to FIGURE 7, a fragmentary section of the die 18 is illustrated. The die 18 is provided with projecting portions 40 which form the grooves 38 and depressions 37 in the stainless steel sheath 4. As the sheath is initially put in the die on the pins 21, the flat rear bottom surface of the sheath 4 engages the top portion of the projections 40. However, the high pressure of the die metal produced in the die casting operation forces the stainless steel sheath 4 into intimate engagement with the surface of the die 18 over its entire extent and forms the stainless steel sheath 4 over the members 40 in the die 18 to produce the grooves and depressions. The stainless steel and the sprayed coating thereon are sufficiently ductile to withstand the deformation and shaping operation during the die casting operation without breaking the bond between the sprayed metal and the stainless steel sheath. The casting metal 41 in FIGURE 7 bonds over the depressions 37 and 38 as well as the plane areas of the plate 4.

Referring to FIGURE 8 a photomicrograph at 400 diameters taken through an iron sole plate made according to my process is represented. The stainless steel sheath 4 has a roughened sand or grit blasted surface 50 into which the sprayed metal coating has penetrated. The die cast metal matrix 1 has compacted the sprayed metal coating 5, forcing the same into the roughened surface under high pressure and is also blended with the sprayed metal coating 5 as indicated along the line designated by the reference character 51. From the foregoing it is apparent that the sprayed coating has a firm adherent mechanical bond with the stainless steel sheath and has a firm adherent blended bond with the cast aluminum metal 1.

Composite articles produced by the foregoing process are characterized by high mechanical strength and high thermal shock resistance. Smoothing iron sole plates constructed in accordance to the foregoing process have been subjected to repeat operations whereby they were first heated to approximately 600° F. and then plunged into water in a range of temperature 50° to 60° F. without producing any apparent deterioration or weakening of the bond between the aluminum matrix 1 and the stainless steel sheath 4.

The high mechanical and thermal strength of the bond between the die cast aluminum matrix and the stainless steel sheath is believed due in large part to the absence of a brittle ferro-aluminum alloy structure at the interface 50 between the stainless steel sheath 4 and sprayed metal coating 5. In addition, the ductility of the intermediate metal in the sprayed coating appears to render the composite bond between the main body matrix 1 and sheath 4 able to withstand severe thermal shock without weakening or separating. It is further believed that the combination of heat and pressure which forces the sprayed metal film into intimate contact with the roughened surface of the ferrous metal body causes some molecular bonding to occur which produces firm, continuous adhesion between the ferrous metal body and the sprayed and cast metal bodies and also insures good thermal conduction therebetween. The term "molecular bonding" as used herein means that the molecules of the two metals are forced into such intimate contact and alignment that molecular forces become strongly operative as distinguished from an alloying action between the two metals. The roughened surface of the ferrous metal body is highly important in facilitating the formation of a molecular bond between the two metals as the projecting points on the roughened surface produce extremely high localized pressures against the sprayed metal when the casting pressure forces the sprayed metal onto the roughened surface during the casting operation.

The foregoing process as described herein may be followed completely without variation when the sprayed metal coating is aluminum-containing metal or stainless steel. With a molybdenum spray, however, it is desirable to minimize the heating operation with the burner 25 as molybdenum begins to oxidize at about 600° F. In the use of the device, the dies are usually heated or will quickly become heated to a temperature of about 500° to 600° F. and the intermediate heating operation with the burner 25 may be dispensed with altogether or reduced in time when the sheath 4 is sprayed with molybdenum which should not be heated above about 500° F. prior to the casting operation.

The foregoing process though particularly applicable to the production of composite metal articles including iron sole plates is applicable generally to the production of die cast aluminum articles having a ferrous metal such as stainless steel bonded to one portion thereof by a ductile layer of sprayed metal under conditions such that a hard, brittle ferro-aluminum alloy film at the interface between the dissimilar metals is avoided.

While my process has been explained in detail herein using the preferred combination of stainless steel as the sheath material, certain ductile corrosion-resistant metals as the sprayed coat and the aluminum metal as the die cast material to produce sole plates for smoothing irons, it is within the purview of my invention to apply my process to other articles and to practice my invention by applying my unique molecular bonding process to other ferrous base metals and to use other sprayed coating metals of sufficient ductility to be molecularly bonded to the roughened surface of the sheath at the temperatures and pressures employed in die casting aluminum metal thereonto, such as for example, copper and alloys thereof or ferrous metals other than stainless steel.

I claim:

A process of producing a laminated metallic article having a cast aluminum metal body firmly united with a ferrous metal body having high mechanical bond strength and resistance to thermal shock which comprises the steps of grit blasting the surface of the ferrous body to which the cast aluminum metal is to bonded to roughen said surface, spraying a thin film of ductile and corrosion resistant metal selected from the group consisting of aluminum, molybdenum and stainless steel onto the grit blasted surface of the ferrous metal, heating the sprayed film of metal to a temperature below the melting temperature thereof sufficient to allow die cast metal to flow into the interstices of the sprayed metal film before chilling of the die cast metal, casting a body of aluminum metal onto the heated sprayed metal film with sufficient pressure to compact and densify the sprayed metal and to force the same into intimate engagement with the irregularities in the grit blasted surface of the ferrous metal while forcing the cast metal into intimate engagement with the irregular surface of the sprayed metal film, and chilling the composite body below the melting temperature of the aluminum metal before the formation of detectable ferro aluminum alloys.

References Cited in the file of this patent

UNITED STATES PATENTS

| | | |
|---|---|---|
| 2,396,730 | Whitfield | Mar. 19, 1946 |
| 2,543,936 | Reynolds | Mar. 6, 1951 |
| 2,611,163 | Schaefer et al. | Sept. 23, 1952 |
| 2,807,700 | Jepson | Sept. 24, 1957 |
| 2,840,195 | Holton | June 24, 1958 |
| 2,893,083 | Ladd | July 7, 1959 |